Dec. 25, 1951  F. W. BURGESSER  2,579,733
COATED SEED
Filed July 3, 1947

FREDERICK W. BURGESSER,
INVENTOR.

BY
ATTORNEY.

Patented Dec. 25, 1951

2,579,733

UNITED STATES PATENT OFFICE 2,579,733

COATED SEED

Frederick W. Burgesser, Compton, Calif., assignor to Filtrol Corporation, Los Angeles, Calif., a corporation of Delaware Application July 3, 1947, Serial No. 760,180

4 Claims. (Cl. 47—1)

This invention relates to improvements in the coating of seeds prior to planting.

It is advantageous to use planting machines in the commercial planting of seeds. Many types of seeds cannot be sown efficiently by the use of planting machines because of lack of uniformity in size and shape of the seeds, or for the reason that the seeds are too small for effective handling in the machines.

The concept of coating the individual seeds to provide pellets of predetermined uniform size and shape suitable for use in planting machines is not a new concept. Various materials have been suggested for forming the coatings. A satisfactory coating material must meet a number of requirements. Economic considerations require that the material be inexpensive and capable of easy application to the seeds so that the cost of the coated seeds does not become prohibitive. The material must form a coating having sufficient strength and hardness to withstand ordinary handling and to be capable of passing through the planting machines without breakage. The material must not adversely affect the ability of the seeds to germinate and grow and no binding agent can be used which would have such adverse effect on the seeds. The coating must be formed in the absence of sufficient water or other moisture to cause swelling or premature germination of the seeds. The coating must be capable of absorbing water so that the seeds can obtain the necessary moisture from the soil after planting. The coating must also become soft after absorbed water to thus permit germination and growth of the seeds.

Application Serial No. 698,384, filed September 20, 1946, jointly by Stanard R. Funsten and myself, describes and claims the coating of plant seeds with native or raw sub-bentonite clays. Sub-bentonites are a class of montmorillonite clays, the base-exchange capacity of which is satisfied largely by Ca and Mg ions. They may be termed alkaline earth bentonites. They are of the class of bentonites which are activatable by acid treatment to produce active adsorbents and petroleum cracking catalysts. They are substantially non-swelling when compared with ordinary swelling bentonites, the base-exchange ions of which are largely alkali ions, particularly sodium ions. The process of coating seeds described in the above mentioned application and the seeds thus coated represent a substantial advance in the art of coated seeds. That process is being used in the commercial production of coated seeds and the thus coated seeds have received wide commercial acceptance. The present invention is an improvement over that described in the above-mentioned application.

Seeds coated with raw sub-bentonite clays in accordance with the teachings of the above-mentioned application have not given as high percentage of germination as might have been desired. The results of germination tests have been poorer after the raw sub-bentonite coated seeds had been stored for a period of months prior to planting and, in some instances, the results of germination tests on the raw sub-bentonite coated seeds have not been as favorable as the results of similar tests upon uncoated seeds. It should be borne in mind that there are many advantages from the use of coated seeds, even though the percentage of germination is lower than with uncoated seeds, but it is naturally desirable to obtain as high percentage of germination as possible. The present invention relates to the coating of seeds with a new combination or mixture of materials for the purpose of obtaining an increased percentage of germination of the coated seeds.

The primary object of the invention is to provide coated seeds which exhibit increased percentages of germination when compared with the coated seeds heretofore produced.

A further object of the invention is to provide coated seeds which may be stored for extended periods prior to planting without substantial decrease in the percentage of germination.

Still another object of the invention is to provide a process for the production of coated seeds which have the advantages discussed in the foregoing objects.

Figure 1:
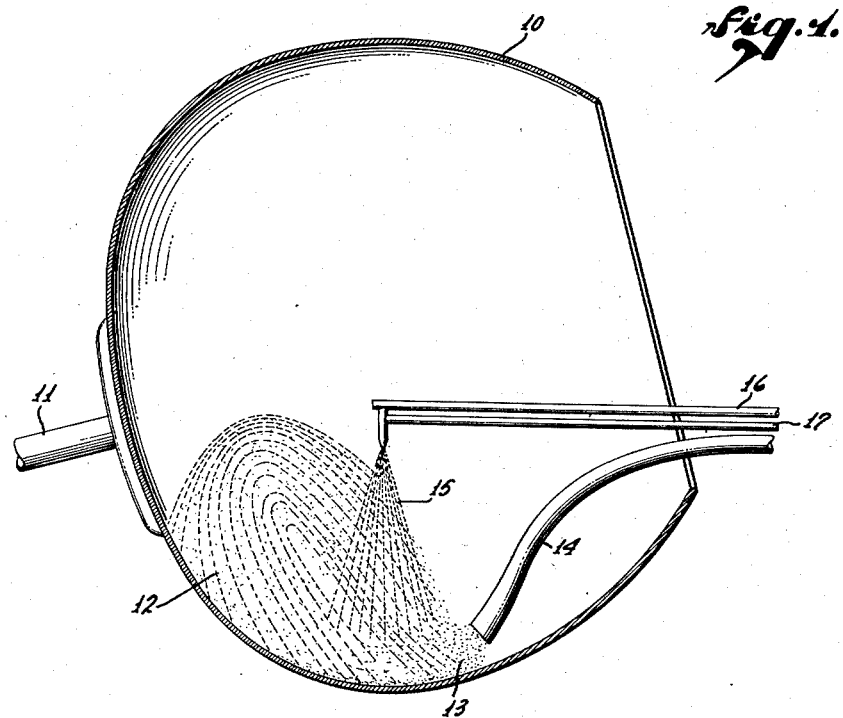
Fig. 1 is a suitable apparatus which may be used for coating the seeds.
Figures 2, 3:
Fig. 2 is a cross-sectional view of a coated beet seed.
Fig. 3 is a cross-sectional view of a coated lettuce seed.

I have found that the results of germination tests can be substantially improved and that the period between the coating and the planting of seeds can be materially increased by coating the seeds with a mixture of raw sub-bentonite clay and acid-activated sub-bentonite clay. The acid-activated sub-bentonite clay is obtained by treating the raw sub-bentonite with an acid, usually sulfuric acid, at an elevated temperature for sufficient time to obtain the desired degree of reaction. In general, the acid activated sub-bentonite clays used commercially for decolorizing lubricating oils or fatty oils or for catalytic cracking will be found suitable for the purposes of this invention. Usually the raw sub-bentonite is treated with sulfuric acid of concentration of about 10 to 20% at an acid dosage of from about 25 to 100% (dosage being the weight of $H_2SO_4$ in pounds per 100 pounds of clay calculated on the volatile free basis measured by heating a sample to 1700° F. to constant weight) at an elevated temperature of about 200 to just below the boiling point and to a final hydrated silica content of from 15 to 30%. Hydrated silica is determined by leaching the sample three times with a boiling 2% $Na_2CO_3$ solution, and the soluble hydrated silica determined by analysis of the filtrate by gravimetric or colorimetric procedure.

I have found that germination is substantially increased when the coating material consists of as little as 10% of the acid-activated sub-bentonite with the remaining 90% of the material being raw sub-bentonite clay. My experiments have shown that the percentage of germination further increases gradually when the proportion of acid-activated sub-bentonite clay is increased from 10% to about 30%. Further increases in the proportion of acid-activated sub-bentonite clay above about 30% do not appear to improve the results of the germination tests, although there appears to be no sharp reduction in the germination results until the percentage of acid-activated sub-bentonite clay in the coating material exceeds about 50%. The increase in germination is substantial for all proportions of the two components of the coating material from 10% acid-activated sub-bentonite clay and 90% raw sub-bentonite clay to 50% of each of the components, and I regard that range of percentages as within the scope of my invention. I have found, however, that a mixture of 30% acid-activated sub-bentonite clay and 70% raw sub-bentonite clay gives germination results which are at least equivalent to and perhaps superior to any other proportions of the components of the coating material. I prefer this last mentioned proportion of the components for the reason that the acid-activated sub-bentonite clay is somewhat more expensive than the raw sub-bentonite clay, and economic considerations therefore dictate the use of the smallest percentage of acid-activated sub-bentonite clay which produces the greatest improvement in results.

Suitable apparatus for use in coating the seeds may be similar to that disclosed in the aforementioned application, and which is illustrated in the accompanying drawing which is a longitudinal sectional view of the apparatus. The reference numeral 10 designates an engrossing pan similar to those in common use by candy makers. The engrossing pan 10 is rotatable on a tilted axis 11. A suitable quantity of seeds, which are designated in the drawing by the reference numeral 12, are placed in the engrossing pan. The appropriate mixture of acid-activated sub-bentonite clay and raw sub-bentonite clay, designated in the drawing by the reference numeral 13, is slowly added to the engrossing pan through the spout 14. The seeds and the mixture of clays are sprayed by a finely atomized water spray 15 formed from water flowing through pipe 16 and compressed air flowing through pipe 17. The engrossing pan 10 is rotated continuously during the addition of the mixture of clays 13 and the water spray 15, and the rotation may be continued after a sufficient quantity of water and clay mixture has been added.

The water spray 15 slightly moistens the seeds 12 and the clay mixture 13. During rotation of the engrossing pan 10 the seeds become coated with the moist clay mixture. The coating is surprisingly uniform on the seeds and the resulting pellets are substantially uniform in size and shape. The thickness of the coating can be controlled by controlling the amount of clay mixture which is supplied through the spout 14. The quantity of water should be limited to that which is necessary to assure proper coating and may easily be ascertained by test.

The seeds are removed from the engrossing pan and must be handled with reasonable care while the coating is moist. The coating must be dried at a temperature which is below the temperature which would effect sterilization of the seeds. The coating must be dried sufficiently to prevent the possibility of unintentional germination of the seeds, but it should not be dried to the extent of removal of lattice water or water of crystallization from the clay particles. I have found it preferable to dry the coating to the point where it contains from 15% to 25% of volatile matter.

The particle size of the components of the clay mixture must be controlled within reasonable limits, and I prefer to use a raw sub-bentonite clay having a mesh analysis showing about 100% through the 40 mesh screen and about 10% through the 325 mesh screen and an acid activated clay having a mesh analysis showing about 100% through the 32 mesh screen and 100% retained on the 100 mesh screen.

I am not presently able to definitely explain the reasons for the improved results which are obtained by the use of the mixture of acid-activated sub-bentonite and raw sub-bentonite clay over the results which are obtained from the use of raw sub-bentonite clay alone. I have ascertained that the coating which is the subject of this invention is more porous and more permeable to the passage of air and gases than the coatings made entirely of raw sub-bentonite clay. I believe that this increased porosity and gas permeability may be responsible for, or at least contribute to, the improved results by permitting oxygen to reach the coated seeds and permitting carbon-dioxide to escape from the seeds during the germination period.

The acid-activated sub-bentonite clays have a lower pH value than the raw sub-bentonite clays. The pH value of the raw sub-bentonite clay is approximately 7.2. The pH value of a mixture of 90% raw sub-bentonite clay and 10% acid-activated sub-bentonite clay is approximately 5.9, while a mixture of equal parts of raw sub-bentonite clay and acid-activated sub-bentonite clay has a pH value of about 3.9.

I have made investigations for the purpose of ascertaining whether the lower pH values which result inherently from the use of the mixture of raw sub-bentonite clays and acid-activated sub-bentonite clays are responsible for my improved results. These investigations involved germination tests of seeds which had been coated with raw sub-bentonite clay, the pH of which had been adjusted to various lower values by the addition of acid. These tests revealed that no noticeable improvement was obtained by merely lowering the pH value of the raw sub-bentonite clay coating. These tests also indicated that the percentage of germination dropped sharply at pH values of below about 3.9 which, as indicated above, is approximately the pH value of a mixture of 50% acid-activated sub-bentonite clay and 50% raw sub-bentonite clay. These results seem to indicate that while pH values of above about 3.9 have little or no effect on the percentage of germination of the seeds, pH values below about 3.9 are not suitable for favorable seed germination. This fact probably explains the sharp drop in percentage of seed germination in my attempts to use more than 50% of acid-activated sub-bentonite clay in my coating material.

My invention is in no way limited to the foregoing or other theoretical considerations, and it is understood that the benefits of my invention are obtainable without regard to the theoretical considerations which are involved.

I have shown and described what I now conceive to be the most practicable and preferred embodiment of my invention, but I recognize that various departures may be made from the foregoing description without departing from the invention in its broader aspects as defined by the following claims.

Having thus described my invention, I claim:

1. A seed pellet consisting of a plant seed embedded in a hard, dry, smooth, outer coating of a naturally adhesive composition, said coating comprising a mixture of finely divided native sub-bentonite clay and acid activated sub-bentonite clay so proportioned as to produce a pH value between 3.9 and 5.9, and being compacted as a unit about the seed by the inherent adhesivity of the finely divided sub-bentonite clay, said pellet having a thickness at least several times greater than the original plant seed and said coating being readily disintegrated upon contact with moisture.

2. A seed pellet consisting of a plant seed embedded in a hard, dry, smooth, outer coating of a naturally adhesive composition, said coating comprising a mixture of between 50 per cent and 90 per cent of finely divided native sub-bentonite clay and between 10 per cent and 50 per cent of a finely divided acid activated sub-bentonite clay, and being compacted as a unit about the seed by the inherent adhesivity of the finely divided sub-bentonite clay, said pellet having a thickness at least several times greater than the original plant seed and said coating being readily disintegrated upon contact with moisture.

3. A seed pellet consisting of a plant seed embedded in a hard, dry, smooth, outer coating of a naturally adhesive composition, said coating comprising a mixture of approximately 70 per cent of finely divided native sub-bentonite clay and approximately 30 per cent of finely divided acid activated sub-bentonite clay, and being compacted as a unit about the seed by the inherent adhesivity of the finely divided sub-bentonite clay, said pellet having a thickness at least several times greater than the original plant seed and said coating being readily disintegrated upon contact with moisture.

4. A seed pellet consisting of a plant seed embedded in a hard, dry, smooth, outer coating of a naturally adhesive composition, said coating comprising a mixture of between 50 per cent and 90 per cent of finely divided native sub-bentonite clay and between 10 per cent and 50 per cent of finely divided acid activated sub-bentonite clay and having a pH value between 3.9 and 5.9, and being compacted as a unit about the seed by the inherent adhesivity of the finely divided sub-bentonite clay, said pellet having a thickness at least several times greater than the original plant seed and said coating being readily disintegrated upon contact with moisture.

FREDERICK W. BURGESSER.

REFERENCES CITED

The following references are of record in the file of this patent:

UNITED STATES PATENTS

| Number | Name | Date |
|--------|------|------|
| 79,765 | Lafferty | July 7, 1868 |
| 312,041 | Upjohn | Feb. 10, 1885 |
| 1,319,157 | Lingle | Oct. 21, 1919 |
| 1,819,953 | Funk | Aug. 18, 1931 |
| 2,392,518 | Barnhill | Jan. 8, 1946 |